United States Patent [19]
Bosch et al.
[11] 3,800,246
[45] Mar. 26, 1974

[54] CONTROL OF GUNN OSCILLATIONS BY LIGHT IRRADIATION

[75] Inventors: Berthold Bosch; Horst Pollmann, both of Ehrenstein, near Ulm; Gerhard Schickle, Backnang/Wurttemberg, all of Germany

[73] Assignee: Telefunken Patentverwertungsgesellschaft m.b.H., Ulm/Donau, Germany

[22] Filed: Nov. 10, 1966

[21] Appl. No.: 593,514

[30] Foreign Application Priority Data

| | | |
|---|---|---|
| Nov. 11, 1965 | Germany | 29765 |
| Feb. 18, 1966 | Germany | 30485 |
| Dec. 16, 1965 | Germany | 30042 |
| Dec. 24, 1965 | Germany | 30163 |

[52] U.S. Cl. .......... 332/16 R, 250/217 SS, 307/311, 331/107 G, 332/52, 350/160, 330/4.3

[51] Int. Cl. .......................... H03c 3/22, H03b 7/06

[58] Field of Search ........ 250/211 J, 217 SS, 217 L, 250/199; 330/4.3; 332/3, 16, 52; 307/311, 307/278; 350/160, 161; 331/107 G, 107 T; 317/234; 329/144, 205

[56] References Cited

UNITED STATES PATENTS

| | | | |
|---|---|---|---|
| 3,440,425 | 4/1969 | Hutson et al. | 331/107 G X |
| 3,435,307 | 3/1969 | Landauer | 331/107 G X |
| 3,339,153 | 8/1967 | Hakki | 331/107 G |
| 3,365,581 | 1/1968 | Tell et al. | 350/160 UX |
| 3,373,380 | 3/1968 | Adler | 350/160 X |

OTHER PUBLICATIONS

Miller–"Light Powered Oscillator"–IBM Tech. Disclosure Bulletin, Vol. 3, No. 4, p. 38 September, 1960.

Kikuchi et al. "The 'Sogicon'" A New Type of Semiconductor Oscillator" Journ. of Phys. Soc., Japan, Vol. 17, 1962 pp. 881–882.

*Primary Examiner*—Alfred L. Brody
*Attorney, Agent, or Firm*—Spencer & Kaye

[57] ABSTRACT

The present invention relates to a semiconductor probe operating on the semiconductor Gunn or volume effect, the probe preferably consisting of a III–V semiconductor of predetermined dimensions, wherein the probe has a negative resistance when there is applied to it a voltage which exceeds a critical voltage. When light having a wavelength which is smaller than that of the absorption edge is radiated onto the active semiconductor layer of a Gunn effect arrangement, a photo current arises which is added to the current which flows as a result of the applied d.c. bias through the semiconductor probe, and by using this photo current the negative resistance of the probe may be controlled.

12 Claims, 7 Drawing Figures

INVENTORS
Berthold Bosch
Horst Pollmann &
Gerhard Schickle

BY Spencer & Kaye
ATTORNEYS

INVENTORS
Berthold Bosch
Horst Pollmann &
Gerhard Schickle
BY Spencer & Kaye
ATTORNEYS INVENTORS
Berthold Bosch
Horst Pollmann &
Gerhard Schickle BY Spencer & Kaye
ATTORNEYS

CONTROL OF GUNN OSCILLATIONS BY LIGHT IRRADIATION

Recently, a new method has become known for generating electromagnetic oscillations in the microwave range, based on the so-called semiconductor Gunn or volume effect, as described, for example, in "Solid State Communications," 1 (1963), pages 88 to 91, "Microwave Oscillations of Current in III–V Semiconductors." Such an effect is also disclosed in copending application, Ser. No. 592,595, filed on Nov. 7, 1966, and now abandoned for SIGNAL PROCESSING CIRCUIT which corresponds to German applications T 29,740 T 29,970, T 30,021, T 30,024, and T 30,098.

Also, it has been proposed to utilize the negative resistance which occurs with this volume effect for amplifying electromagnetic oscillations.

It is the object of the present invention to provide a new way of influencing the electromagnetic oscillations which are produced or which underlie the amplifying in the volume effect arrangement.

Another object of the invention is to provide a Gunn effect arrangement wherein light radiation is used to control the negative resistance.

These objects and others ancillary thereto are accomplished in accordance with preferred embodiments of the present invention wherein the desired influencing is effected by modulated light radiation. Surprisingly, it has been found that when light having a wavelength which is preferably smaller than that of the absorption edge is radiated onto the active semiconductor layer of a Gunn effect arrangement, by producing electron-hole pairs, a photo current arises which is added to the current which flows as a result of the applied d.c. bias through the semiconductor probe. With the help of this influencing of the probe current or probe resistance by light radiation, it is thus possible to control the negative resistance of the probe.

Additional objects and advantages of the present invention will become apparent upon consideration of the following description when taken in conjunction with the accompanying drawings in which.

Figure 1:
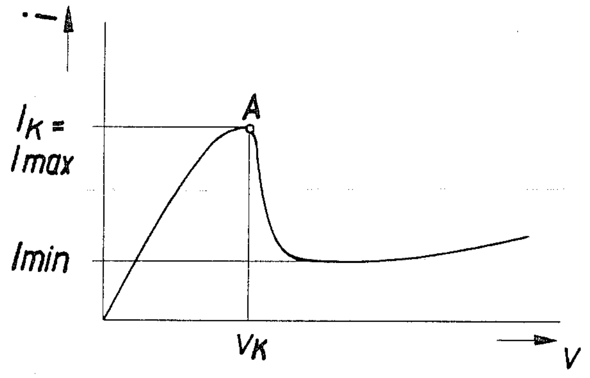
FIG. 1 is the current-voltage plot of a Gunn effect semiconductor device of the type mentioned above.

With more particular reference to the drawings, FIG. 1 shows the current-voltage characteristic of a volume-effect semiconductor of the type described above, in which A is one possible operating point at which the voltage applied to the probe is equal to the critical voltage $V_K$ which is needed for triggering the oscillations. The current oscillations which then result in the external circuit vary between the two values $I_{max}$ and $I_{min}$. If, for example, the semiconductor probe is biased above the critical voltage $V_K$, so that current or voltage oscillations can arise, the same can be inhibited by light radiation. This occurs when, with a load resistance $R_L$ being present, there is no constant voltage feeding to the probe *Pr* and the photo current which arises upon light radiation L is so large that the bias at the probe drops below the critical value $V_K$.

Figure 2:
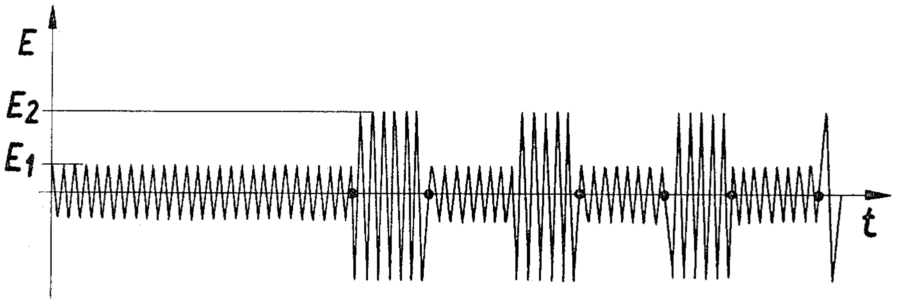
FIG. 2 is a time plot of the distribution of the intensity of the entering light.

When the incoming light has, for example, the optical field strength $E_1$, the probe oscillations will be interrupted only if the bias of the probe does not lie more than a certain amount above the critical value $V_K$. If the incoming light has the optical field strength $E_2$, where $E_2$ is greater than $E_1$, the oscillations will also stop if the bias of the probe is greater than in the first case above the critical value $V_K$. The reason for this is that the voltage change at the probe, in the latter case due to the greater light intensity, and the larger photo current pertaining thereto, is likewise larger. In this way it is possible to check whether a given light intensity is above or below a desired light intensity, in that the stopping of the oscillations is measured in dependency on the selected bias of the probe. The threshold values can be adjusted by appropriately selecting the bias V. FIG. 2 shows a possible distribution of the incoming light intensity in which it is assumed that the same varies periodically between the two light strengths $E_1$ and $E_2$.

The a.m. threshold values of the light intensity can be adjusted by suitably selecting the bias of the semiconductor probe. It is also possible, in accordance with the present invention, to vary the mentioned threshold values by using different semiconductor probes.

According to a further feature of the invention, two semiconductor probes can be provided which have applied to them biases that exceed the critical bias to different extents. Here, a light intensity region can, in a manner of speaking, be "filtered out." Should both probes respond to the light radiation, that is to say, if both probes interrupt the probe oscillations, then the light intensity is above the threshold given by the higher bias. If, on the other hand, the probe with the higher bias does not stop oscillating but the probe with the smaller bias does, the intensity of the incoming light is above the light intensity given by the lower bias but below the light intensity given by the higher bias. If, then, a plurality of probes or different probes are used which are biased to different extents above the critical voltage $V_K$ and if the light intensity is the same, or if the bias of at least one probe is varied, the intensity of the incoming light can be determined.

If several semiconductor probes are used, it is advantageous when the same are applied to a common substrate and if they consist of the same semiconductor material. In a particular embodiment of the invention the two probes have the same oscillating frequency.

It is also possible, when the oscillating frequencies are alike, to make the semiconductor probes of different semiconductor materials.

According to a further feature of the invention, the individual probes can be so dimensioned that the resulting probe oscillations have different frequencies.

Figure 3:
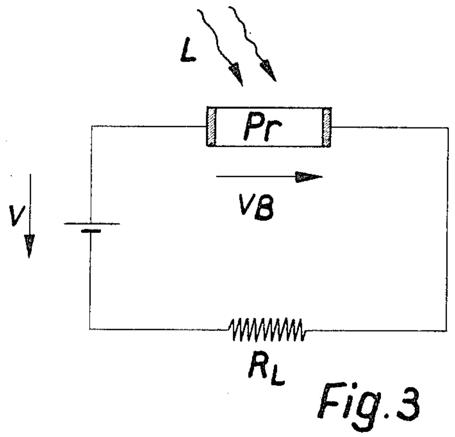
FIG. 3 is a circuit diagram of a first and simple embodiment of the present invention.

FIG. 3 is a circuit diagram of an arrangement, which, in the simplest case, includes a series circuit of a semiconductor probe *Pr*, a bias source V and a load resistor $R_L$. The incoming light radiation is shown by the wavy arrows L. The effective bias voltage applied to the semiconductor probe is shown at $V_B$.

Figure 4:
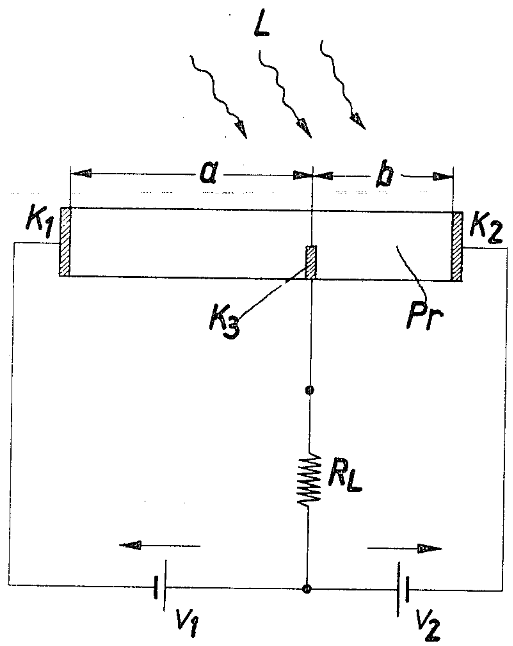
FIG. 4 is a circuit diagram of another embodiment in which two semiconductor probes are used.

FIG. 4 shows an embodiment in which two semiconductor probes are used. The overall probe *Pr* has two end contacts $K_1$ and $K_2$ and a further contact $K_3$ which divides the probe into two regions. The probe portion having the length *a* receives its bias from the voltage source $V_1$, while the probe portion having the length *b* receives its bias from the voltage source $V_2$. The load resistor $R_L$ is connected between the contact $K_3$ and the junction of the two voltage sources $V_1$ and $V_2$. Alternatively, if a number of semiconductor probes or probe portions are used, each of them can act on its load resistor which, however, is not illustrated in FIG. 4.

The probe oscillations can also be influenced by letting the photo current of an illuminated photo diode D (a photo transistor or a photo resistor) bring about a suitable voltage change of the semiconductor probe. Such a circuit is shown in FIG. 5 where the current flowing when the light L strikes the photo diode D produces a higher voltage drop across resistor $R_1$, which again causes the voltage $V_B$ across the probe *Pr* to drop.

The voltage source is shown at V and is between the above-mentioned resistor $R_1$ and the junction of the photo diode and the load resistor $R_L$. The a.m. additional photo diode (photo transistor or photo resistor) is so connected in the circuit that when the light L strikes the additional element D, the photo current thereof controls the voltage at the volume-effect semiconductor probe in a predetermined manner.

Figure 5:
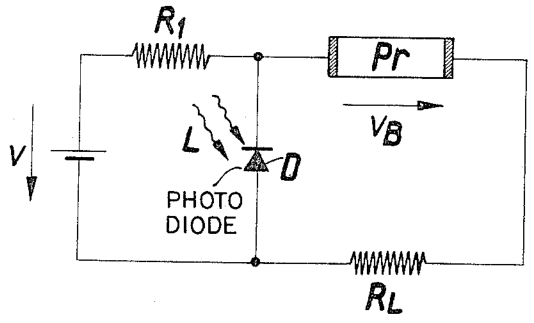
FIG. 5 is a circuit diagram of an embodiment of the invention using a photo diode.
Figure 6:
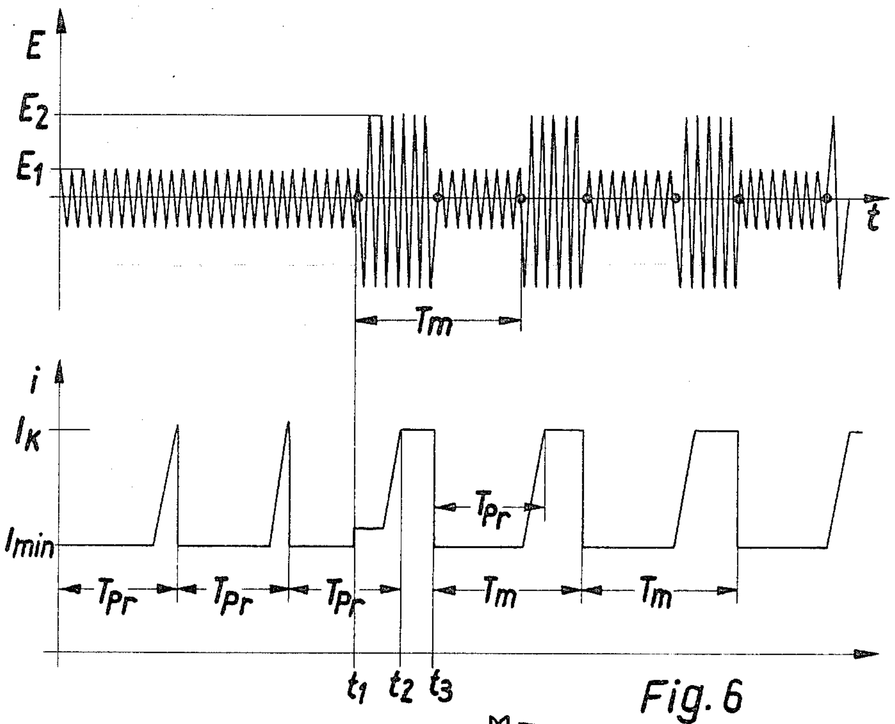
FIG. 6 shows two time plots, one of the optical field strength of the light and the other of the current flowing through the load resistor, for the embodiments of FIGS. 3 and 5.

The embodiments of the invention shown in FIGS. 3 and 5 can be used for demodulating modulated light, as explained in conjunction with FIG. 6. Here, the optical field strength E of the incoming light L and the current *i* flowing through the load resistor $R_L$ are shown as a function of time *t*. Let it first be assumed that the optical field strength has the value $E_1$ which is so small that the photo current produced thereby does not let the voltage $V_B$ across the probe drop below the critical value $V_K$. Thus, so long as the field strength remains at $E_1$, the probe will continue to oscillate, as shown in the lower part of FIG. 6, the duration of the period being $T_{Pr}$. The duration of the period $T_{Pr}$ is equal to the transit time of the charge carrier through the probe. If, then, the field strength E of the incoming light L increases to the value $E_2$, and if as a result of this there is produced such a photo current, and therefore such a reduction in the probe resistance, that the voltage $V_B$ at probe Pr drops below a critical value $V_K$, the current cycle can not, as was heretofore the case, again start after the time $T_{Pr}$, but only at instant $t_3$ when the optical field strength E has again dropped to the lower value $E_1$. Beginning with instant $t_3$, the current will oscillate with a period having a duration $T_m$, that is to say, that of the modulation of the light and no longer with the period duration $T_{Pr}$. In the example of FIG. 6 it is assumed that:

$$T_m > T_{Pr} > ½T_m.$$

It will thus be seen that the modulated light L can be demodulated, the demodulated signal being taken off the load resistor $R_L$.

As is well known, the start of current oscillations in the semiconductor volume depends on the high field zone which is produced in the semiconductor probe when the applied voltage exceeds a given value. This build-up of the high field zone results from a production center in the semiconductor volume and thereafter moves to the anode at the speed of the charge carriers. The duration of the period of the generated oscillations is approximately equal to the transit time of the high field zone from the production center to the anode of the semiconductor probe (assuming the semiconductor material to be n-conductive). Normally, the mentioned production center is formed by a local nonhomogeneity in the semiconductor crystal. In the crystals which are normally used for this purpose, however, there will usually be a number of such centers at different places between the cathode and the anode, none of which centers is unambiguously preferred for triggering the high field zone. The disadvantage of this is that no coherent oscillations will arise.

In accordance with a further feature of the present invention this drawback is eliminated by letting the light beam L have such large intensity and such small diameter that a preferred production center for the high field zone which characterizes the volume effect is attained, and this brings with it the coherence of the produced oscillations. In a particular preferred embodiment of the present invention the semiconductor probe is subjected to a laser beam of sufficiently small diameter. As a result, a preferred production center is created in the semiconductor probe, which alone is effective for the duration of the illumination.

In accordance with another feature of the present invention the light source is so arranged and fashioned that the light beam which impinges on the probe is movable between the anode and cathode of the semiconductor probe. As described above, the duration of the period of the produced oscillation of the semiconductor probe is related to the transit time of the high field zone to the anode. By shifting the production center, it is thus possible to influence the duration of the period of the resulting oscillations in the desired manner, thereby to obtain frequency regulation or modulation. In practice, it is best if the light beam be deflected electronically.

Figure 7:
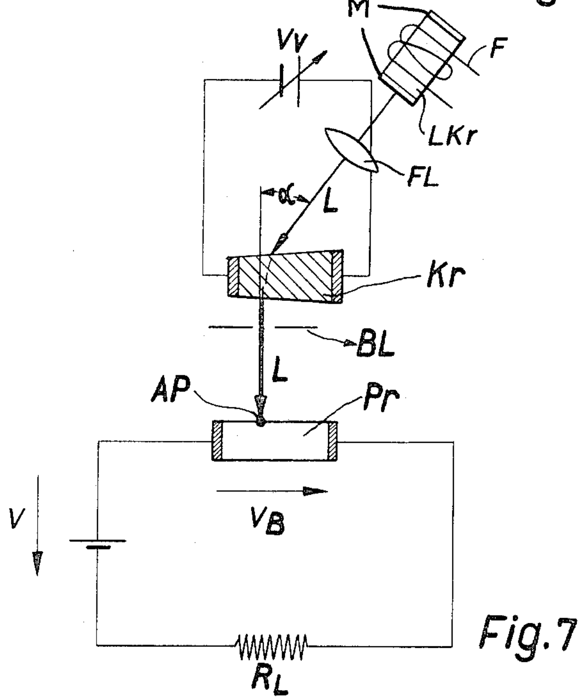
FIG. 7 is a circuit diagram of a further embodiment of the present invention.

Such an arrangement is shown schematically in FIG. 7. The arrangement comprises the semiconductor probe Pr which receives the requisite operating voltage $V_B$ from the d.c. voltage source V. The load resistor $R_L$ is in series with the semiconductor probe and the d.c. voltage source. The point at which the light radiation L strikes the probe is shown at AP, this radiation being utilized to influence the semiconductor probe. In order to allow the point of impingement to be varied, the light is passed through a crystal *Kr* which is ahead of the semiconductor probe, this crystal having an adjustable d.c. bias $V_V$ applied to it via ohmic contacts. This crystal can consist of potassium dihydrophosphate or ammonium dihydrophosphate. The voltage applied to the crystal is of the order of several kilovolts. If the crystal is lithiumniobate or lithiumtantalate, the application of several hundred volts will already suffice to deflect a light beam passed through the crystal. In FIG. 7, the deflection is shown greatly exaggerated; the deflection of the light ray in the crystal is based on the change of the index of refraction and is known per se. In practice, the maximum obtainable deflection angle $\alpha$ of such an arrangement is about ± 1°. According to a further feature of the present invention, the light beam is produced by a laser diode, the same preferably being made of the same material as the semiconductor probe of the oscillator.

If the semiconductor probe is utilized as the amplifier for electromagnetic oscillations, the same can likewise be influenced by light radiation. Here, the negative resistance of the probe is so influenced by radiation with light waves L which can, if desired, be modulated, that the degree of amplification and/or the frequency at which the maximum amplification occurs, changes. The regulation is carried out in that the photo current which is produced in the semiconductor when light impinges varies the voltage across the probe. In particular, coherent light can be used as the radiation. The circuitry is arranged as shown in FIG. 3, in which the probe Pr is so arranged in a resonant circuit that its negative resistance causes the amplification of the oscillation to which the resonant circuit is tuned. This can be done, for example, by inserting the probe in the interrupted inner conductor of a coaxial tank circuit. Moreover, the desired influencing of the volume-effect amplifier can also be brought about in that a photo diode D, a photo transistor or a photo resistor is connected in the external circuit of the semiconductor probe in such a way that the photo current produced by the light radiation influences the direct current voltage which lies at the semiconductor probe, in a manner analogous to the circuit shown in FIG. 5.

By fashioning the amplifier in accordance with the present invention, there is obtained a relatively simple way of regulating the amplification by light radiation, which regulation follows the suitable modulation of the light radiation.

As mentioned above a laser is particularly suited for producing the light beam L. A practical arrangement of the present invention using a laser for the direct illumination of the Gunn element is shown in FIG. 7. The laser crystal *Lkr*, surrounded by the flash lamp F and coated with two mirrors M, emits the light beam L which is focussed by the lens FL onto the deflection crystal *Kr*. From the crystal *Kr* the light passes to the Gunn element *Pr*. A suitable light emitter is a chromium doped ruby laser producing about 1 W power.

It will be understood that the above description of the present invention is susceptible to various modifications, changes, and adaptations, and the same are intended to be comprehended within the meaning and range of equivalents of the appended claims.

What is claimed is:

1. A semiconductor device comprising, in combination: a semiconductor probe of predetermined dimensions and of the type in which electromagnetic Gunn effect oscillations are generated or amplified when an electric field is applied to said probe so as to create therein a field strength having at least a critical value necessary for triggering such oscillations; a d.c. voltage supply connected across said probe for applying thereto an electric field having such strength for producing such oscillations; and means associated with said probe for causing light radiation having a wavelength smaller than that of the absorption edge of the semiconductor to impinge thereon so as to inhibit the occurrence of the electromagnetic oscillations in said probe.

2. A semiconductor device as defined in claim 1 wherein said probe is made of a III–V semiconductor material.

3. A semiconductor device as defined in claim 1 wherein said means causes the light radiation to impinge directly on said semiconductor probe.

4. A semiconductor device as defined in claim 1, comprising a circuit component whose electrical characteristics change when it is struck by light, said component being connected in circuit with said probe and said supply so that its photo current influences the voltage which is applied to said semiconductor probe.

5. A semiconductor device as defined in claim 1, comprising load resistance means connected to form a circuit with said supply and said probe.

6. A semiconductor device as defined in claim 5 wherein said means for causing light radiation to impinge acts to produce modulated light, and a demodulated signal is present at the load resistance.

7. A method of controlling the negative resistance of a Gunn effect arrangement, comprising the steps of:

applying a varying electric field to a semiconductor probe of predetermined dimensions and of the type in which, due to the Gunn effect, electromagnetic oscillations are generated or amplified when an electric field strength exceeding a critical value is applied thereto; and radiating light having a wavelength smaller than that of the absorption edge of the semiconductor onto the arrangement for inhibiting the electromagnetic oscillations.

8. A method as defined in claim 7 wherein the light is directed to impinge directly on the semiconductor probe.

9. A method as defined in claim 7 wherein the light is directed to impinge directly on a circuit component electrically connected with said probe and whose electrical characteristics change when it is struck by light.

10. A semiconductor device comprising, in combination: a semiconductor probe of predetermined dimensions and of the type in which electromagnetic Gunn effect oscillations are generated or amplified when an electric field is applied to said probe so as to create therein a field strength having at least a critical value necessary for triggering such oscillations; a d.c. voltage supply connected across said probe for applying thereto an electric field having such strength; and means associated with said probe for applying to said probe a high intensity light beam having a diameter which is small in comparison with the dimensions of said probe for creating a preferred production center for producing the high field zone which characterizes the volume effect and hence coherence of the generated oscillation.

11. A semiconductor device as defined in claim 10 wherein the point at which the light beam impinges on the probe is electronically shiftable.

12. An arrangement as defined in claim 11 further comprising means disposed in the path of said light beam for shifting the point of impingement of the beam along the probe to modulate the repetition frequency of the oscillations.

* * * * *